US012773747B2

(12) United States Patent
Nakamura

(10) Patent No.: US 12,773,747 B2
(45) Date of Patent: Oct. 27, 2026

(54) WORKPIECE EDGE POSITION DETECTION DEVICE AND WORKPIECE EDGE POSITION DETECTION METHOD

(71) Applicant: FANUC CORPORATION, Yamanashi (JP)

(72) Inventor: Ryousuke Nakamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 933 days.

(21) Appl. No.: 18/040,979

(22) PCT Filed: Sep. 29, 2021

(86) PCT No.: PCT/JP2021/035977
§ 371 (c)(1),
(2) Date: Feb. 8, 2023

(87) PCT Pub. No.: WO2022/075158
PCT Pub. Date: Apr. 14, 2022

(65) Prior Publication Data
US 2023/0264290 A1 Aug. 24, 2023

(30) Foreign Application Priority Data
Oct. 6, 2020 (JP) ................................ 2020-169230

(51) Int. Cl.
*B23K 26/03* (2006.01)
*B23K 26/08* (2014.01)

(52) U.S. Cl.
CPC .......... *B23K 26/03* (2013.01); *B23K 26/0876* (2013.01)

(58) Field of Classification Search
CPC ... B23K 26/03; B23K 26/0876; B23K 26/048
See application file for complete search history.

(56) References Cited

U.S. PATENT DOCUMENTS 8,957,890 B2 * 2/2015 Yamamoto ............ G06F 3/0418 463/36
2013/0313235 A1 11/2013 Wadehn et al.

FOREIGN PATENT DOCUMENTS

CN 103764339 A 4/2014
CN 106903429 A 6/2017
CN 111085774 A 5/2020
JP S63-130293 A 6/1988
(Continued)

*Primary Examiner* — Robert G Bachner
(74) *Attorney, Agent, or Firm* — HAUPTMAN HAM, LLP

(57) ABSTRACT

Provided is a workpiece edge position detection device with which it is possible to accurately detect the position of a workpiece edge even under conditions in which an inclined portion is present on the workpiece. A workpiece edge position detection device includes: a control unit that controls the position of a machining head, on which a gap sensor is mounted, such that a spacing with respect to the workpiece as detected by the gap sensor remains fixed while the machining head is scanned along the surface of the workpiece; and a workpiece edge detection unit that, during execution by the control unit of the control for keeping the gap fixed, detects the position of an end section of the workpiece on the basis of the coordinate position of the machining head when the amount of variation in the spacing between the gap sensor and the workpiece has reached or exceeded a prescribed threshold value.

7 Claims, 15 Drawing Sheets

(56) References Cited

FOREIGN PATENT DOCUMENTS

| | | | |
|---|---|---|---|
| JP | H2-80185 | A | 3/1990 |
| JP | H3-85184 | U | 8/1991 |
| JP | 2000-42774 | A | 2/2000 |
| JP | 2000218593 | A | 8/2000 |
| JP | 2003-181670 | A | 7/2003 |
| JP | 2011-34501 | A | 2/2011 |

* cited by examiner

WORKPIECE EDGE POSITION DETECTION DEVICE AND WORKPIECE EDGE POSITION DETECTION METHOD

RELATED APPLICATIONS

The present application is a National Phase of International Application No. PCT/JP2021/035977 filed Sep. 29, 2021, which claims priority to Japanese Application No. 2020-169230, filed Oct. 6, 2020.

FIELD

The present invention relates to a workpiece edge position detection device and a workpiece edge position detection method.

BACKGROUND

In a state in which a processing target workpiece is mounted on a work table of a machine tool, the workpiece may slip from a predetermined position. A machine tool configured to perform suitable processing on the workpiece by detecting misalignment of the workpiece in such a case is known (such as PTL 1).

Further, a machine tool detecting, by scanning the surface of a workpiece by a gap sensor installed on a laser processing head, a hole or the like formed on the workpiece is also known (such as PTL 2).

CITATION LIST

Patent Literature

[PTL 1] Japanese Unexamined Patent Publication (Kokai) No. 2000-042774 A

[PTL 2] Japanese Unexamined Utility Model Publication (U. M. Kokai) No. H3-85184 U

SUMMARY

Technical Problem

In order to detect misalignment or the like of a workpiece mounted on a machine tool, accurate detection of a workpiece edge is required. However, a workpiece such as an iron plate may be in a state in which, for example, the periphery is inclined. Accurate detection of the position of a workpiece edge is desired even in such a situation in which an inclined part exists on a workpiece which may originally be flat.

Solution to Problem

An aspect of the present disclosure is a workpiece edge position detection device including: a control unit controlling, while causing a processing head on which a gap sensor is mounted to scan along a surface of a workpiece, a position of the processing head in such a way as to keep a space to the workpiece constant, the space being detected by the gap sensor; and a workpiece edge detection unit detecting, during execution of control of keeping the space constant by the control unit, a position of an edge of the workpiece, based on a coordinate position of the processing head when a variation in a space between the gap sensor and the workpiece becomes a predetermined threshold value or greater.

Another aspect of the present disclosure is a workpiece edge position detection method including: controlling, while causing a processing head on which a gap sensor is mounted to scan along a surface of a workpiece, a position of the processing head in such a way as to keep a space to the workpiece constant, the space being detected by the gap sensor; and detecting, during execution of control of keeping the space constant, a position of an edge of the workpiece, based on a coordinate position of the processing head when a variation in a space between the gap sensor and the workpiece becomes a predetermined threshold value or greater.

Advantageous Effects of Invention

The aforementioned configuration enables accurate detection of the position of a workpiece edge even in a situation in which an inclined part exists on the workpiece which may originally be flat.

The object, the feature, the advantage, and other objects, features, and advantages of the present invention will become more apparent from detailed description of typical embodiments of the present invention illustrated in the attached drawings.

DESCRIPTION OF EMBODIMENTS

Next, an embodiment of the present disclosure will be described with reference to drawings. In the referenced drawings, similar components or functional parts are given similar reference signs. In order to facilitate understanding, the drawings use different scales as appropriate. A configuration illustrated in a drawing is an example of implementing the present invention, and the present invention is not limited to the illustrated configuration.

Figure 1:
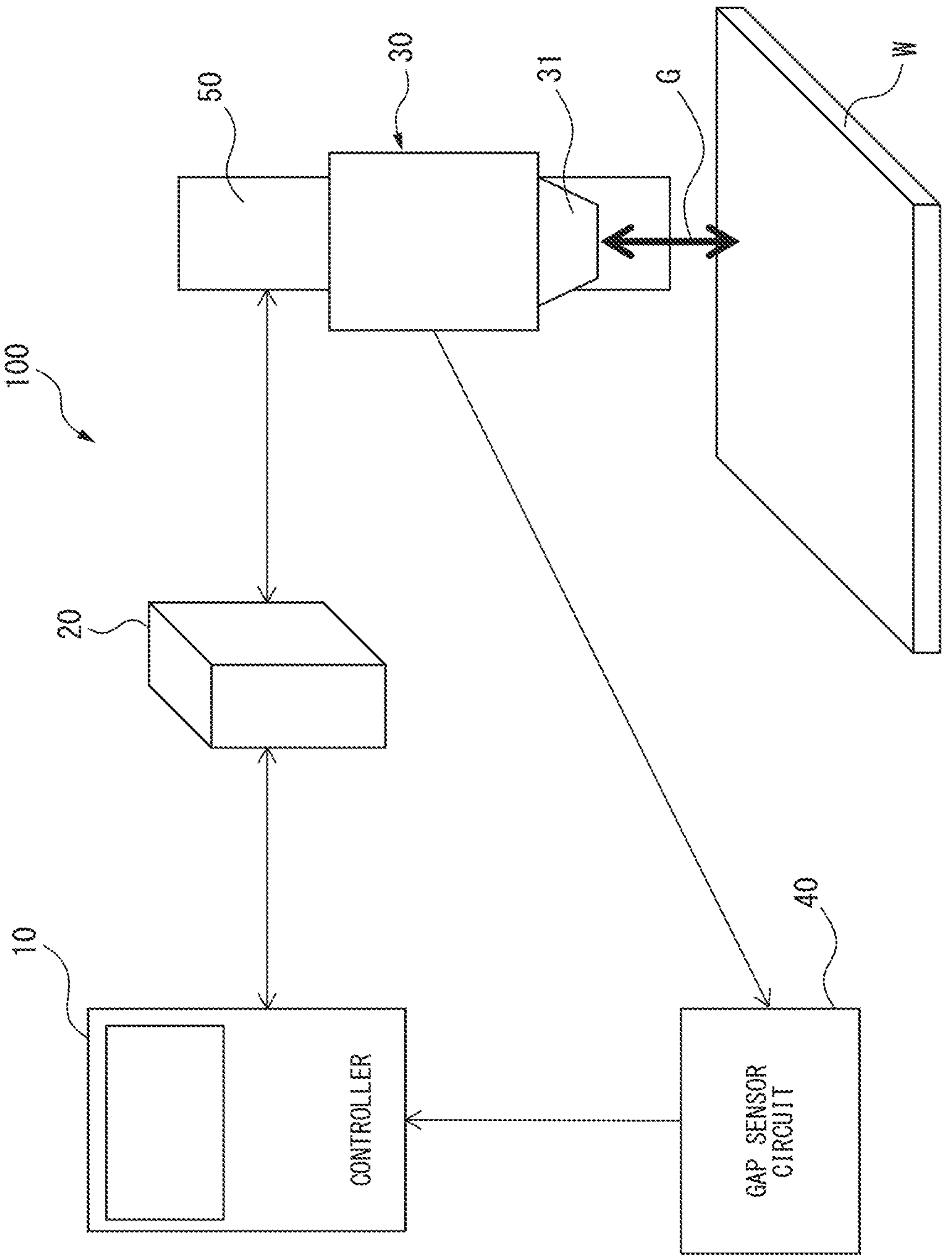
FIG. 1 is a diagram illustrating a device configuration of a workpiece edge position detection device according to an embodiment.

FIG. 1 is a diagram illustrating a device configuration of a workpiece edge position detection device 100 according to an embodiment. As illustrated in FIG. 1, the workpiece edge position detection device 100 includes a controller (CNC) 10, a servo amplifier 20, axial motors 50 driven by the servo amplifier 20 for the X-axis, the Y-axis, and the Z-axis, respectively, a processing head X-, Y-, and Z-axes positions of which relative to a workpiece W are position controlled by drive by each axial motor, a gap sensor 31 mounted on the processing head 30, and a gap sensor circuit 40. In other words, the workpiece edge position detection device 100 is configured as a machine tool. Note that it is assumed that each of the X-, Y-axes represents a horizontal direction, and the Z-axis represents a vertical direction.

The controller 10 is a numerical controller (CNC) generating a command for the motors driving the X, Y, and Z-axes in accordance with a processing program and transmitting the command to the servo amplifier 20. The servo amplifier 20 includes a motor circuit controlling and driving each axial motor and executes servo control on each axial motor 50 in accordance with the command from the controller 10.

For example, the processing head 30 is a laser processing head including a nozzle outputting laser light. Note that, without being limited to such an example, examples of the processing head include various processing heads for executing various types of processing.

The gap sensor 31 is a sensor measuring the distance to the workpiece W. As an example, the gap sensor 31 is a capacitance sensor sensing capacitance between the sensor and a measurement target and outputting a signal representing the measured capacitance to the gap sensor circuit 40. Based on capacitance between flat-plate electrodes being proportional to S/d (S: an electrode area, d: the distance between the electrodes), the gap sensor circuit 40 outputs the distance d (i.e., the space between the gap sensor and the workpiece) from capacitance detected by the gap sensor 31. The space to the workpiece being measured by the gap sensor 31 is hereinafter also described as a gap amount. Note that the gap amount is indicated by an arrow added with a sign G in FIG. 1.

Note that, without being limited to a capacitance sensor, an eddy-current sensor or another type of sensor may be used as the gap sensor 31. When the gap sensor 31 is placed above the workpiece W as illustrated in FIG. 1 as a common usage pattern, the gap sensor 31 is used for the purpose of measuring capacitance to the workpiece in front of (below in the vertical direction in FIG. 1) the gap sensor 31; however, the gap sensor 31 also has some degree of sensitivity in a lateral direction (the horizontal direction in FIG. 1).

As an example, a rectangular workpiece as illustrated is assumed to be the workpiece W. Note that the shape of the workpiece is not limited to the above. The workpiece W is placed on a work table (unillustrated); and processing on the workpiece W is performed by moving the processing head relatively to the workpiece W in the X-, Y-, and Z-axes directions in accordance with control by the controller 10.

Figure 2:
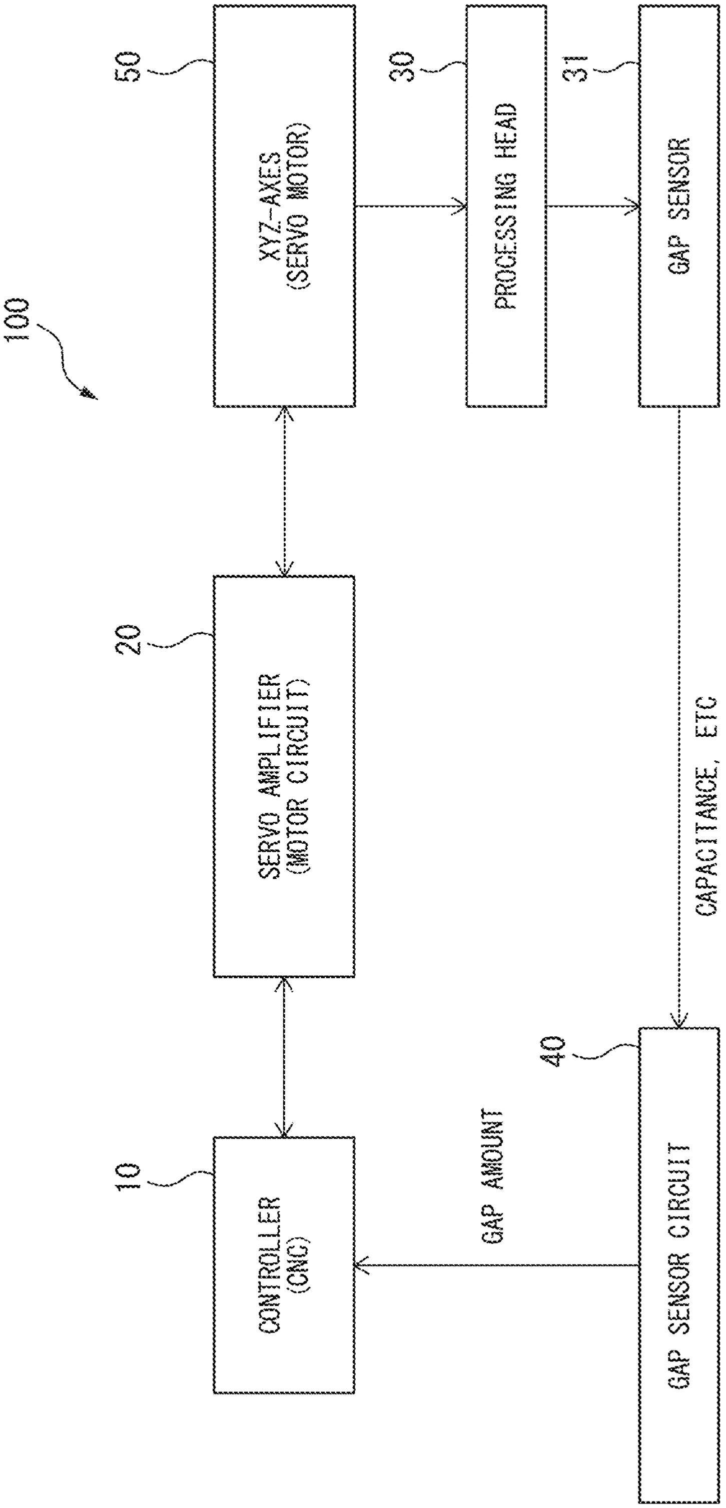
FIG. 2 is a block diagram illustrating a configuration of a control system in the workpiece edge position detection device.

FIG. 2 is a block diagram illustrating a configuration of a control system in the workpiece edge position detection device (machine tool) 100 including the device configuration in FIG. 1. The controller 10 generates a command for each axial motor 50 in accordance with a processing program and transmits the command to the servo amplifier (motor circuit) 20. The servo amplifier executes position control of the processing head 30 by executing servo control of each axial motor 50 in accordance with the command from the controller 10. The gap sensor 31 outputs a signal indicating measured capacitance to the gap sensor circuit 40. The gap sensor circuit 40 provides the controller 10 with a gap amount determined from the output from the gap sensor 31.

With the configuration, the controller 10 can perform position control of the processing head in the X-, Y-, and Z-axes. Further, the controller 10 can perform gap control (control of keeping the distance between the gap sensor 31 and the workpiece constant), based on a gap amount.

Figure 3:
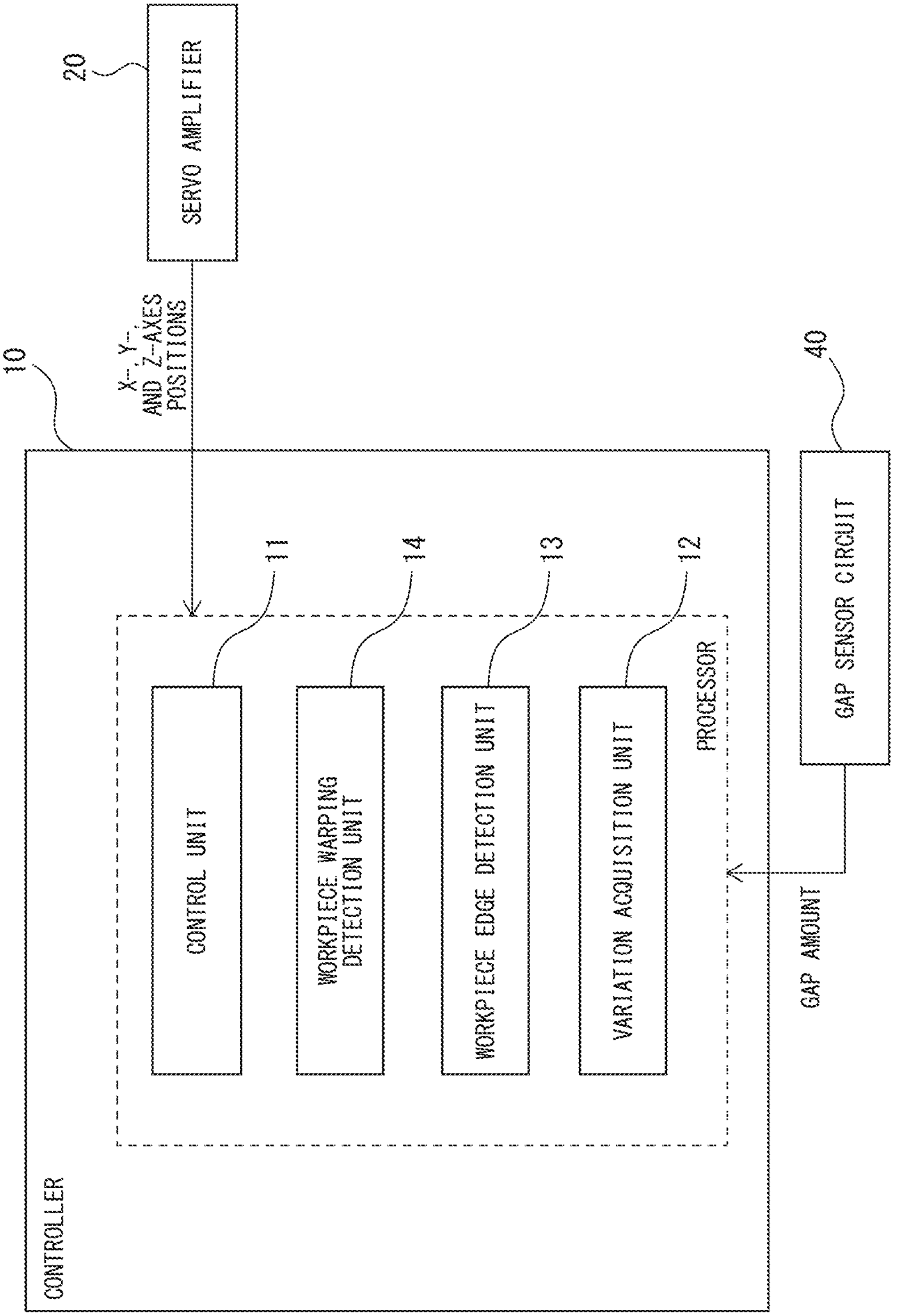
FIG. 3 is a functional block diagram illustrating a functional configuration configured in a controller.

FIG. 3 is a functional block diagram illustrating a functional configuration configured in the controller 10. As illustrated in FIG. 3, the controller 10 includes a control unit 11 controlling, while causing the processing head 30 on which the gap sensor 31 is mounted to scan along the surface of the workpiece W, the position of the processing head 30 in such a way as to keep the space to the workpiece W constant, the space being detected by the gap sensor 31, a variation acquisition unit 12 acquiring a variation in the space between the gap sensor 31 and the workpiece W, and a workpiece edge detection unit 13 detecting the position of an edge of the workpiece W, based on the coordinate position of the processing head 30 when the variation becomes a predetermined threshold value or greater. The controller 10 may further include a workpiece warping detection unit 14 detecting a warped area on the workpiece, based on the variation.

The variation acquisition unit 12 can acquire a gap amount from the gap sensor circuit 40 and acquire positional information of the axial motors 50 for X-, Y-, and Z-axes, respectively, from the servo amplifier 20. The variation acquisition unit 12 determines a variation by using at least one item out of the gap amount and the positional information of each axial motor.

Note that the controller 10 may be configured as a common computer including a CPU (processor), a ROM, a RAM, a storage, an operation unit, a display unit, an input-output interface, a network interface, and the like. The functional blocks of the controller 10 illustrated in FIG. 3 may be provided by executing various types of software stored in the storage by the CPU (processor) in the controller 10 or may be provided by a configuration mainly including hardware such as an application specific integrated circuit (ASIC).

Figure 4:
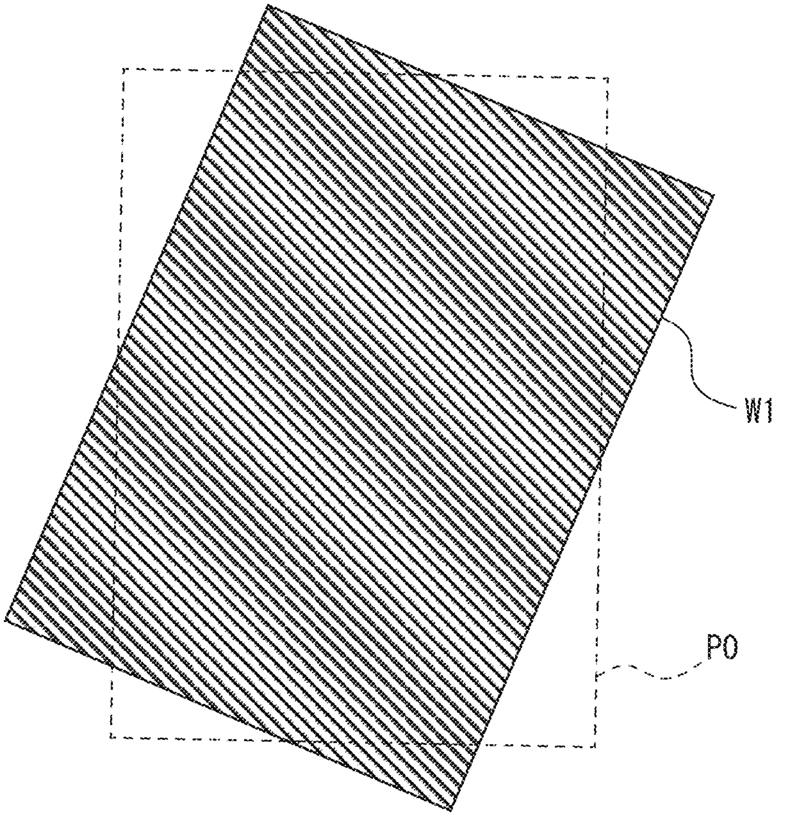
FIG. 4 is a diagram for illustrating misalignment of a workpiece.
Figure 5:
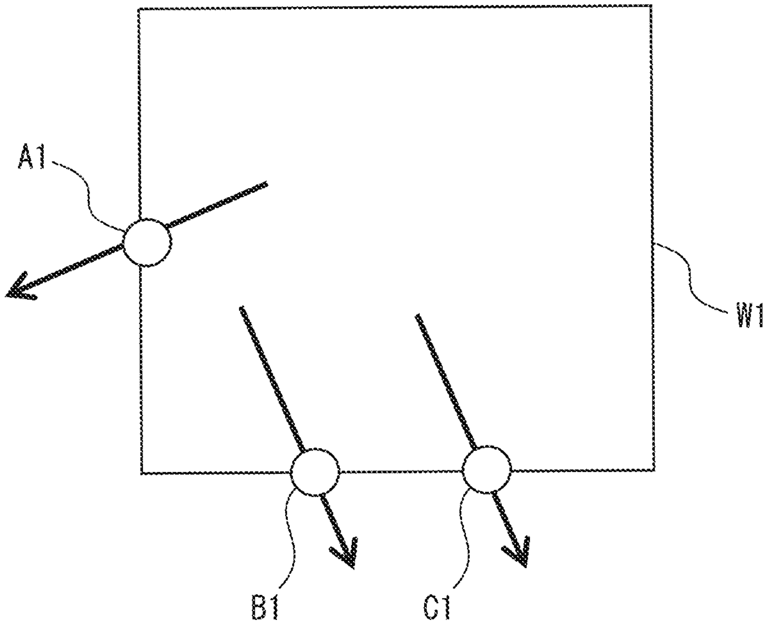
FIG. 5 is a diagram for illustrating procedures for misalignment detection processing of a workpiece.

In a state of being placed on a work table (unillustrated), a processing target workpiece (a workpiece W1 in FIG. 4) may cause misalignment with respect to a reference position P0 where the workpiece W1 may originally be placed, as illustrated in FIG. 4. In order to detect a position of the workpiece W1 thus causing misalignment, the controller 10 executes misalignment detection processing as follows. FIG. 5 is a diagram for illustrating procedures for the misalignment detection processing. Referring to FIG. 5, the procedures for the misalignment detection processing will be described.

(a1) Detect positions B1 and C1 of two edge faces on one side of the workpiece W1.

(a2) Next, detect a position A1 of an edge face on another side adjoining the aforementioned one side.

(a3) Detect the inclinations of the workpiece W1 in the longitudinal direction and the lateral direction in FIG. 4 (i.e., the inclinations relative to the reference position P0) from the positions A1, B1, and C1.

In the aforementioned procedures (a1) and (a2), detection of the positions A1, B1, and C1 is provided by a workpiece edge detection function performed by the controller 10 (workpiece edge detection unit 13). By using thus acquired values indicating misalignment of the workpiece W1, the controller 10 can correct the workpiece position in the processing program and suitably execute processing on the workpiece W1.

The workpiece edge detection function performed by the controller 10 will be described below. The controller 10 (b1) enables gap control (controls the relative height between the workpiece and the gap sensor to be kept constant) and causes the processing head to scan and (b2) detects a workpiece edge by recognizing a sharp change of the distance between the gap sensor and the workpiece at the workpiece edge.

Figure 6:
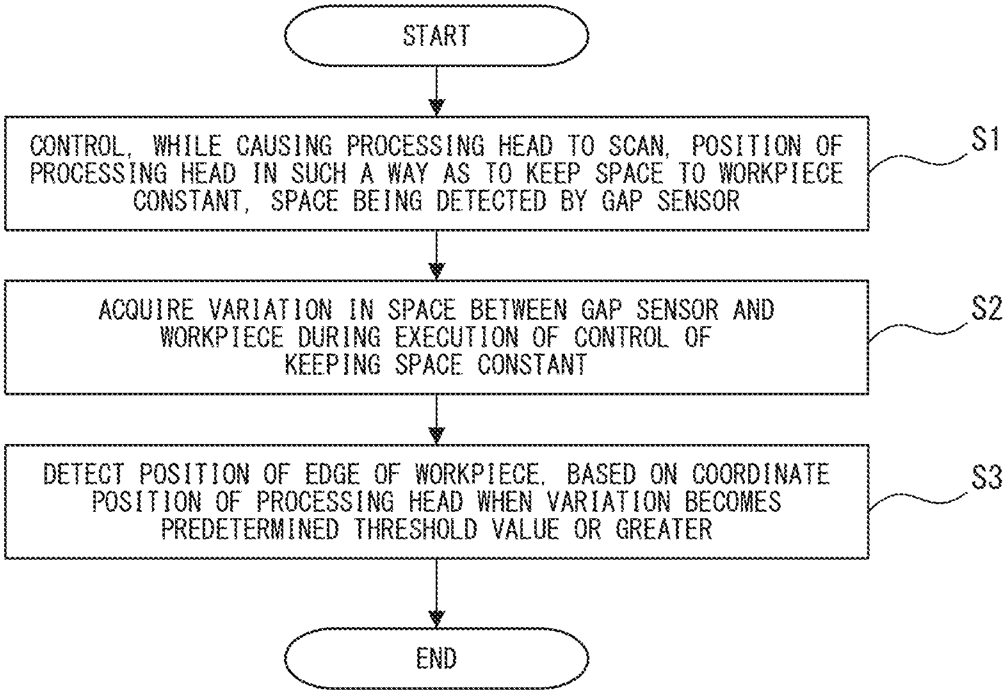
FIG. 6 is a flowchart illustrating workpiece edge detection processing.

In order to provide such a workpiece edge detection function, the controller 10 executes workpiece edge detection processing (a workpiece edge position detection method) illustrated in FIG. 6. FIG. 6 is a flowchart illustrating the workpiece edge detection processing executed under the control of the processor in the controller 10. First, the controller 10 (control unit 11) controls, while causing the processing head 30 to scan along the surface of the workpiece, the position of the processing head in such a way as to keep the space to the workpiece constant, the space being detected by the gap sensor 31 (step S1). Next, the controller 10 (variation acquisition unit 12) acquires a variation in the space between the gap sensor 31 and the workpiece during execution of the control (gap control) by the control unit 11 (step S2). The variation herein includes an error amount in the gap control, a variation value of the distance between the gap sensor 31 and the workpiece, the relative speed between the gap sensor 31 and the workpiece, and various other numerical values related to change in the distance between the gap sensor 31 and the workpiece.

Next, the controller 10 (workpiece edge detection unit 13) detects the position of an edge of the workpiece, based on the coordinate position of the processing head 30 when the variation becomes a predetermined threshold value or greater (step S3). Such workpiece edge detection processing enables reliable detection of the position of the workpiece edge even in a situation in which, for example, an inclined part exists in the periphery of the originally flat workpiece.

Specific operation examples of workpiece edge detection based on the variation acquired by the variation acquisition unit 12 will be described below. The specific examples described in detail below include the following.

Example 1: Detection using a gap control error amount

Example 2: Detection using a Z-axis position

Example 3: Detection using a Z-axis speed

Example 4: Detection using a rate of gap increase

Example 5: Detection using a rate of gap increase—a Z-axis descending speed

Figure 7:
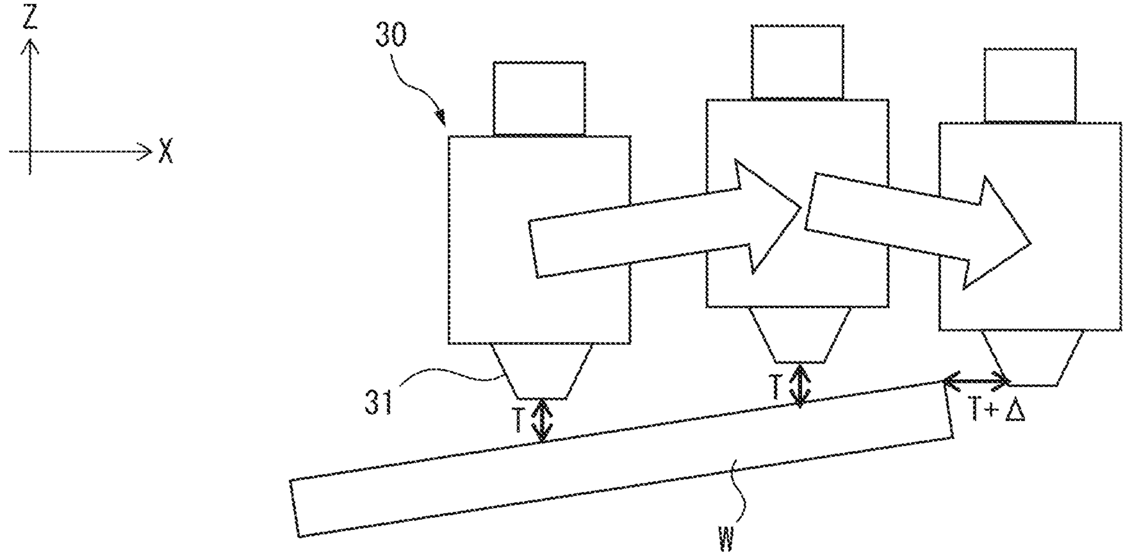
FIG. 7 is a diagram illustrating a scanning state of a processing head in Example 1 of a workpiece edge detection operation.

Example 6: Detection using (a rate of gap increase—a Z-axis descending speed)/an XY-axes composite speed A workpiece edge detection operation in Example 1 (detection using a gap control error amount) will be described with reference to FIG. 7 and FIG. 8. FIG. 7 is a diagram illustrating a state of gap control in this example. When an error amount A is caused with respect to a target value T of a gap in the gap control, control is performed in such a way as to eliminate the error amount A. The error amount A can be detected from the output of the gap sensor 31 during the gap control.

The processing head 30 is caused to scan in an arrow direction (X-axis direction) in FIG. 7. Note that a case of an originally flat workpiece W including a part inclined diagonally upward at the periphery as illustrated is assumed. The distance between the gap sensor 31 (processing head 30) and the workpiece W is maintained at the target value Tin the gap control in the arrow direction in the diagram, and therefore the processing head 30 moves along the surface of the workpiece W while maintaining the distance to the workpiece W at the target value T as illustrated.

Then, when the processing head 30 (gap sensor 31) reaches the workpiece edge, the gap sharply increases at the workpiece edge, and therefore tracking by the processing head 30 in the Z-axis direction is delayed, and the gap control error amount A increases. Note that even when tracking by the processing head 30 in the Z-axis direction is sufficiently fast, scanning in the X-axis direction is continued, and therefore the distance between the processing head 30 and the workpiece W increases in the X-axis direction, and the gap control error amount A increases.

Figure 8:
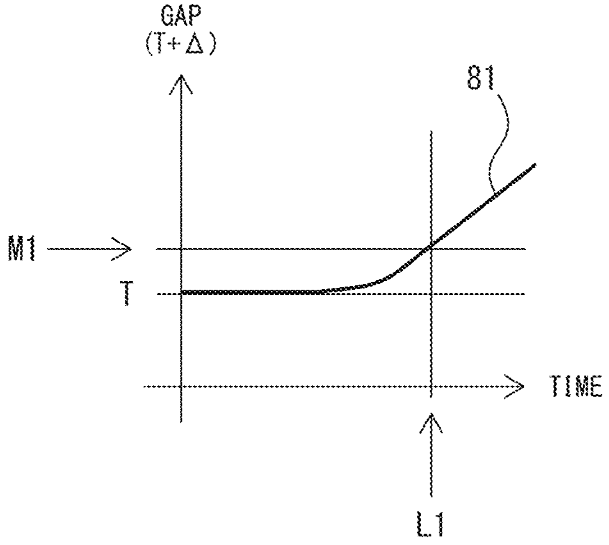
FIG. 8 is a graph for illustrating variations in Example 1 of the workpiece edge detection operation.

A graph 81 in FIG. 8 is a diagram illustrating changes in the gap control amount (i.e., changes in the gap control error amount) when the operation in this example is executed. In FIG. 8, the horizontal axis represents time, and the vertical axis represents the gap control amount (T+Δ). A threshold value M1 is applied to the gap control amount; and a position with a (sign L1) where T+Δ is equal to or greater than (or exceeds) the threshold value M1 is detected as the workpiece edge. In other words, a threshold value is applied to the gap control error amount in this example. The gap control error amount A sharply increases at the workpiece edge, and therefore the workpiece edge can be reliably detected by detecting the position with the (sign L1) as the workpiece edge when T+Δ exceeds the threshold value M1.

Figure 9:
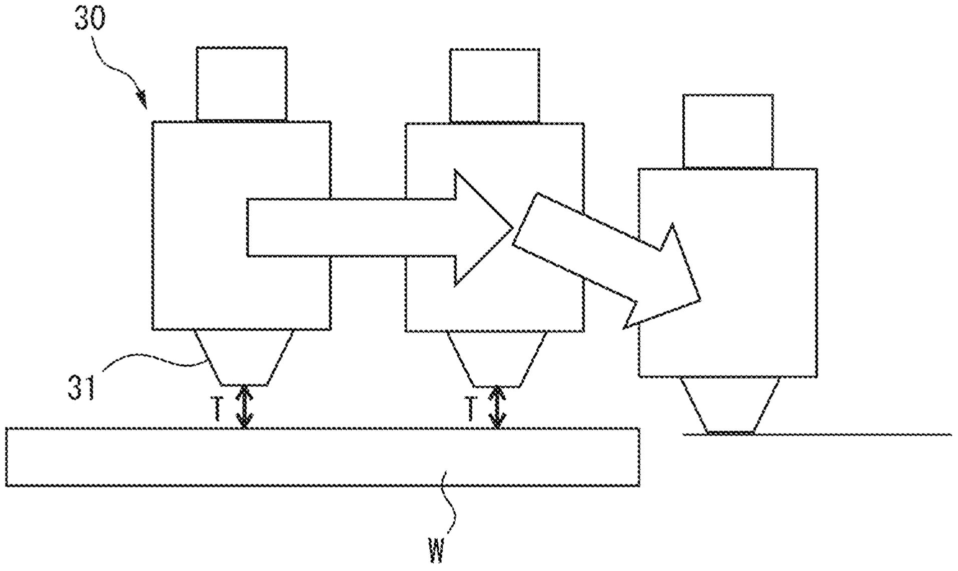
FIG. 9 is a diagram illustrating a scanning state of the processing head in Example 2 of the workpiece edge detection operation.

A workpiece edge detection operation in Example 2 (detection using a Z-axis position) will be described with reference to FIG. 9 and FIG. 10. FIG. 9 is a diagram illustrating a state of gap control in this example. In this example, the position (X-axis position) of the processing head 30 where the Z-axis position becomes a threshold value or less (or less than the threshold value) is detected as the workpiece edge. As described above, when the gap control is enabled and scanning is executed, the laser head considerably descends downward when exceeding the workpiece edge. The descent is recognized as a Z-axis position change of the laser head in this example.

Figure 10:
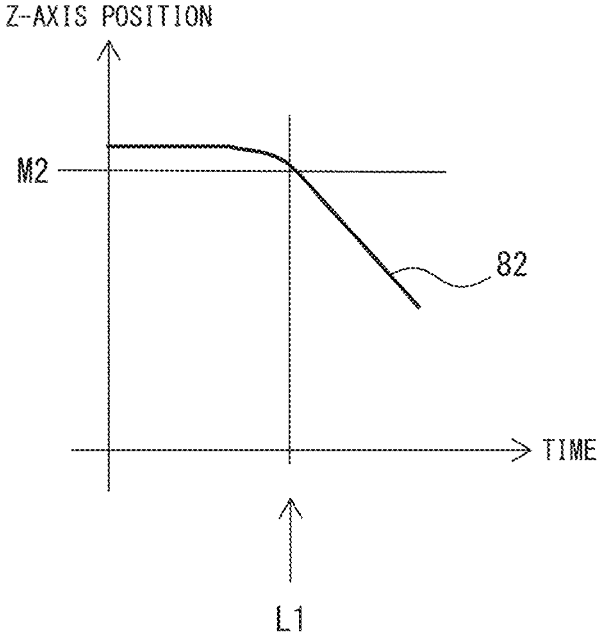
FIG. 10 is a graph for illustrating variations in Example 2 of the workpiece edge detection operation.

A graph 82 in FIG. 10 represents changes in the Z-axis position of the processing head 30 (gap sensor 31) in the operation in this example. In FIG. 10, the horizontal axis represents time, and the vertical axis represents the Z-axis position. As illustrated in the graph 82 in FIG. 10, a position with a (sign L1) where the Z-axis position lowers to a Z-axis threshold value M2 is determined to be the workpiece edge. As illustrated in FIG. 10, the Z-axis position sharply lowers when exceeding the workpiece edge, and therefore the workpiece edge can be reliably detected by determining the position where the Z-axis position becomes the Z-axis threshold value M2 or less (or less than the threshold value M2) as a detected position. The operation in this example corresponds to an operation of recognizing a descending amount in the Z-axis direction as a variation and determining whether the variation exceeds a threshold value. Note that when warping or inclination exists on the workpiece, detection precision may be degraded depending on the height of the workpiece edge in this example.

Figure 11:
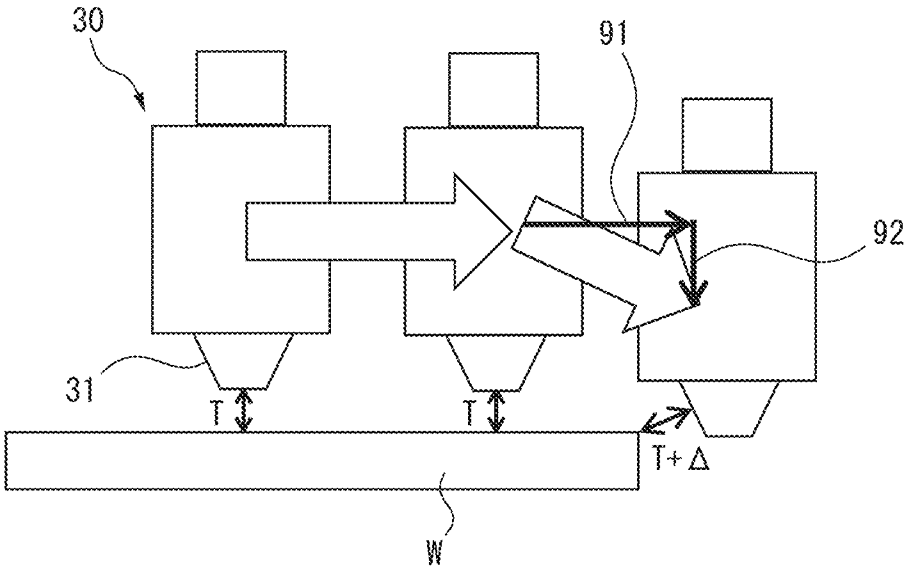
FIG. 11 is a diagram illustrating a scanning state of the processing head in Example 3 of the workpiece edge detection operation.

A workpiece edge detection operation in Example 3 (detection using a Z-axis speed) will be described with reference to FIG. 11 and FIG. 12. FIG. 11 is a diagram illustrating a state of gap control in this example. In this example, a position where the Z-axis speed becomes a threshold value or greater (or exceeds the threshold value) is detected as the workpiece edge. As described above, when the gap control is enabled and scanning is performed, the processing head 30 considerably descends downward when exceeding the workpiece edge. At this time, the Z-axis descending speed also increases. The increase in the Z-axis speed is recognized in this example. Note that an arrow added with a sign 91 represents the speed in a scanning direction (X-axis speed), and an arrow added with a sign 92 represents the Z-axis speed in FIG. 11.

Figure 12:
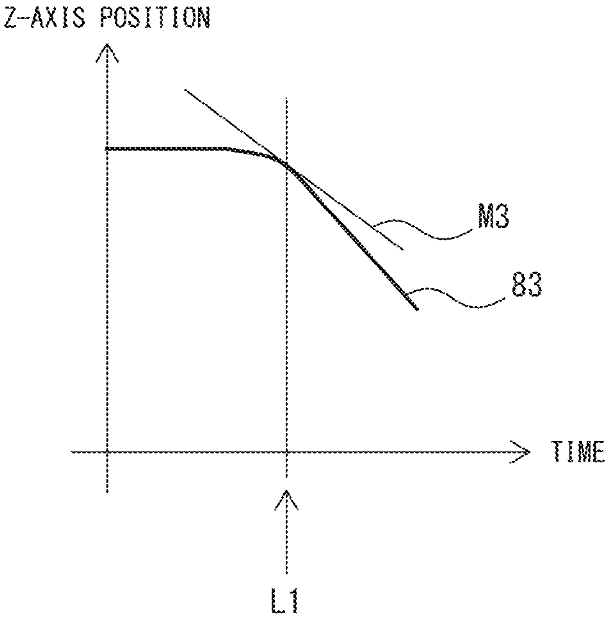
FIG. 12 is a graph for illustrating variations in Example 3 of the workpiece edge detection operation.

A graph 83 in FIG. 12 illustrates changes in the Z-axis position of the processing head 30 in the operation in this example. In FIG. 12, the horizontal axis represents time, and the vertical axis represents the Z-axis position. The controller 10 (variation acquisition unit 12) acquires the Z-axis speed by time-differentiating the graph 83. The Z-axis speed is represented as the inclination of the graph. The workpiece edge detection unit 13 detects a position with a (sign L1) where the Z-axis speed becomes a threshold value M3 or greater (or exceeds the threshold value M3) as the workpiece edge, as illustrated in FIG. 12. The Z-axis speed of the processing head 30 sharply increases from the position where the gap sensor 31 exceeds the workpiece edge, and therefore the workpiece edge can be reliably detected by using the Z-axis speed.

Figure 13:
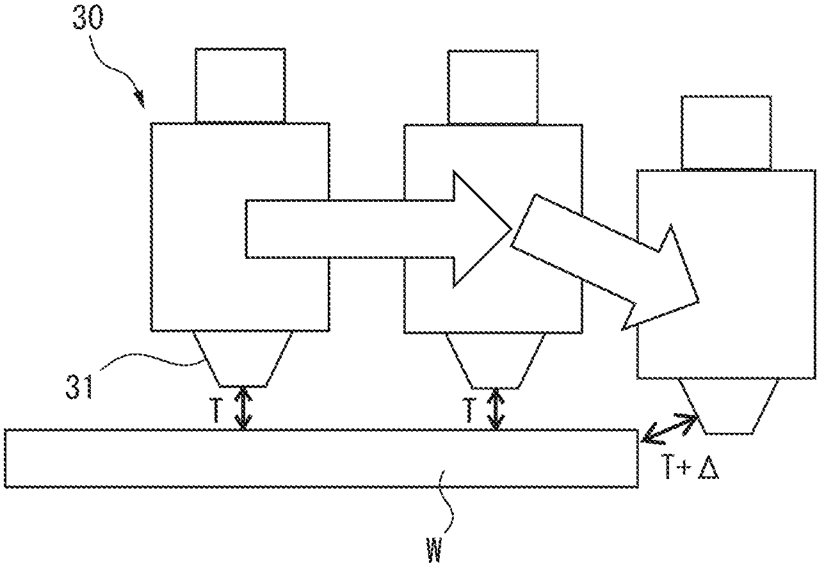
FIG. 13 is a diagram illustrating a scanning state of the processing head in Examples 4 to 6 of the workpiece edge detection operation.

A workpiece edge detection operation in Example 4 (detection using a rate of gap increase) will be described with reference to FIG. 13 and FIG. 14. FIG. 13 is a diagram illustrating a state of gap control in this example. In this example, a position where the rate of gap increase becomes a threshold value or greater (or exceeds the threshold value) is detected as the workpiece edge. As described above, when the gap control is enabled and scanning is performed, the gap control error amount (Δ) sharply increases when the workpiece edge is exceeded. The workpiece edge is detected by recognizing the rate of increase of the gap (gap control error amount 4) in this example.

Figure 14:
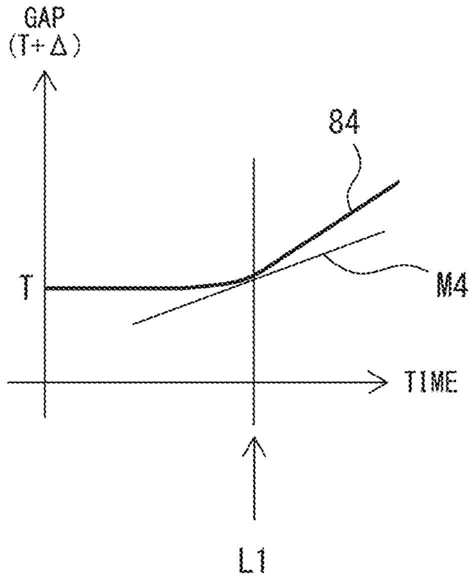
FIG. 14 is a graph for illustrating variations in Example 4 of the workpiece edge detection operation.

FIG. 14 is a diagram illustrating the rate of gap increase in the operation in this example; and the horizontal axis represents time, and the vertical axis represents the gap amount (T+Δ). A graph 84 represents changes in the gap over time in the operation in this example. The controller (variation acquisition unit 12) acquires the rate of gap increase by time-differentiating the gap. The rate of gap increase ((d(T+Δ)/dt)) is represented as the inclination of the graph 84. A position with a (sign L1) where the rate of gap increase becomes a threshold value M4 or greater (or exceeds the threshold value M4) is detected as the workpiece edge, as illustrated in FIG. 14. The gap sharply increases at the workpiece edge, and therefore the rate of gap increase sharply increases similarly at the workpiece edge. Accordingly, the position where the rate of gap increase becomes the threshold value or greater (or exceeds the threshold value) can be detected as a position representing the workpiece edge.

A workpiece edge detection operation in Example 5 (detection using a rate of gap increase—a Z-axis descending speed) will be described with reference to FIG. 15. Note that scanning by the processing head 30 in this example is performed as illustrated in FIG. 13. As described above, when scanning is performed while performing the gap control, the gap error amount (Δ) sharply increases at the workpiece edge, and the processing head 30 (gap sensor 31) performs Z-axis tracking accordingly. In this example, the leaving speed of the workpiece surface viewed from the processing head 30 (gap sensor 31) descending in the Z-axis direction by the Z-axis tracking operation is detected at this time. Since the speed of the workpiece surface viewed from the processing head 30 (gap sensor 31) can be detected, change in the height of the workpiece surface can be recognized regardless of a gap control gain.

Figure 15:
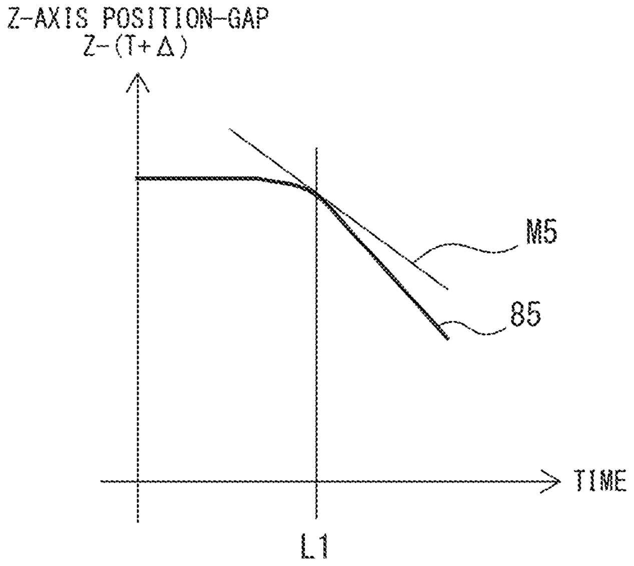
FIG. 15 is a graph for illustrating variations in Example 5 of the workpiece edge detection operation.

FIG. 15 is a diagram illustrating the rate of change of the height of the workpiece surface in the operation in this example; and the horizontal axis represents time, and the vertical axis represents the difference (Z−(T+Δ)) between the Z-axis position of the gap sensor and the gap control amount (T+A). The leaving speed of the workpiece surface viewed from the gap sensor 31 is acquired as the inclination (d(Z−(T+Δ))/dt) of a graph 85. A position (sign L1) where the magnitude of inclination of the graph 85 becomes a threshold value M5 or greater (or exceeds the threshold value M5) is detected as the workpiece edge.

A workpiece edge detection operation in Example 6 ((a rate of gap increase—a Z-axis descending speed)/XY-axes composite speed) will be described with reference to FIG. 16. Note that scanning by the processing head 30 is assumed to be performed as illustrated in FIG. 13 in this example. In aforementioned Example 5, the speed detected as the inclination of the graph 85 has a property that the speed increases as the speed of the processing head 30 in the scanning direction (XY-axes composite speed) increases. Therefore, in order to eliminate the effect of the speed in the scanning direction, a value acquired by dividing the speed detected as the inclination of the graph 85 in aforementioned Example 5 by the speed in the scanning direction (XY-axes composite speed) is used as a variation in this Example 6. The value is a dimensionless value representing an amount close to the spatial shape of the workpiece. Further, the value is a value independent of the speed in the scanning direction (XY-speed), and therefore a merit of a threshold value not being changed according to the speed in the scanning direction (XY-speed) is acquired.

Figure 16:
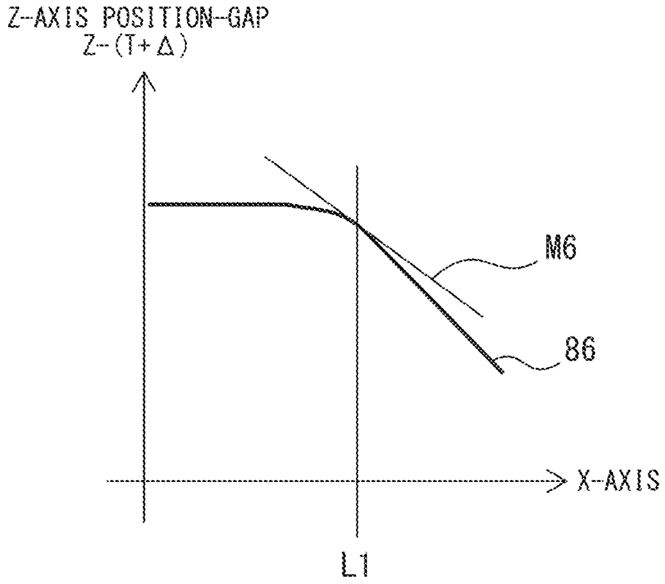
FIG. 16 is a graph for illustrating variations in Example 6 of the workpiece edge detection operation.

A graph 86 in FIG. 16 represents a distribution of the value in the X-axis direction. In FIG. 16, the vertical axis represents (Z−(T+Δ)), similarly to FIG. 14, and the horizontal axis represents the position in the scanning direction (the position in the X-axis direction in this example). A position with a (sign L1) where the inclination of the graph 86 in the diagram becomes a threshold value M86 or greater (or exceeds the threshold value M86) is determined to be the workpiece edge position.

Detection Function of Workpiece Warping

Next, a detection function of warping of a workpiece performed by the workpiece warping detection unit 14 will be described. Performing processing on a part on a workpiece where warping exists may cause defective laser processing or a dimensional error particularly in a part with considerable warping. The controller 10 (workpiece warping detection unit 14) detects a part on the workpiece where warping exists (warped part) by using a variation acquired by the variation acquisition unit 12. Thus, the controller 10 can perform setting in such a way as to exclude the warped part from a processing target area.

Figure 17:
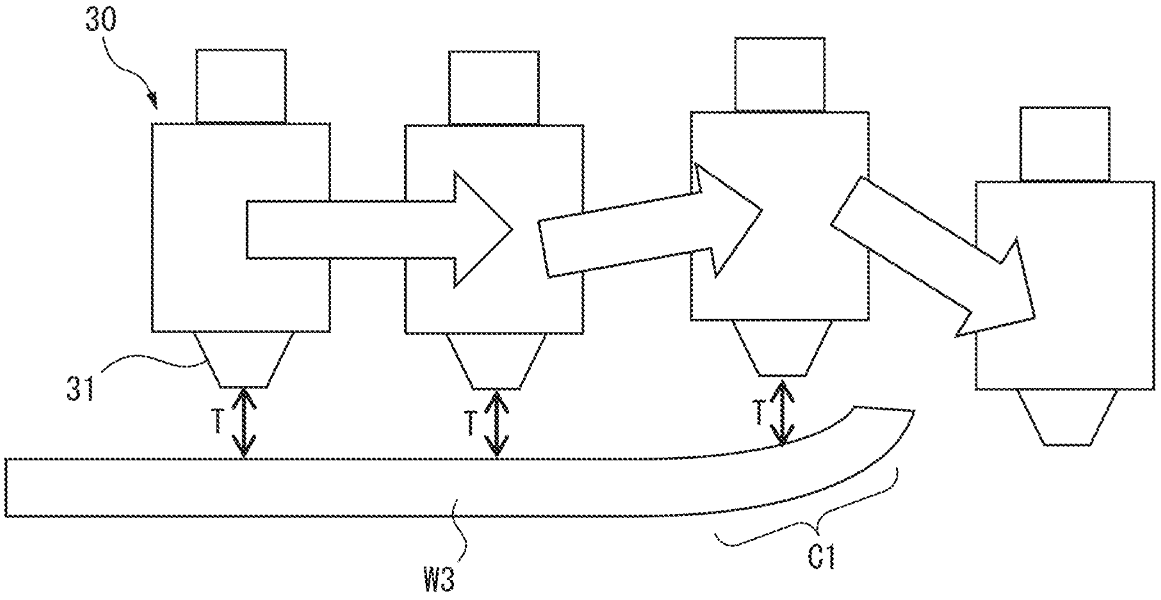
FIG. 17 is a diagram illustrating a scanning state of the processing head in a workpiece warping detection operation.
Figure 18:
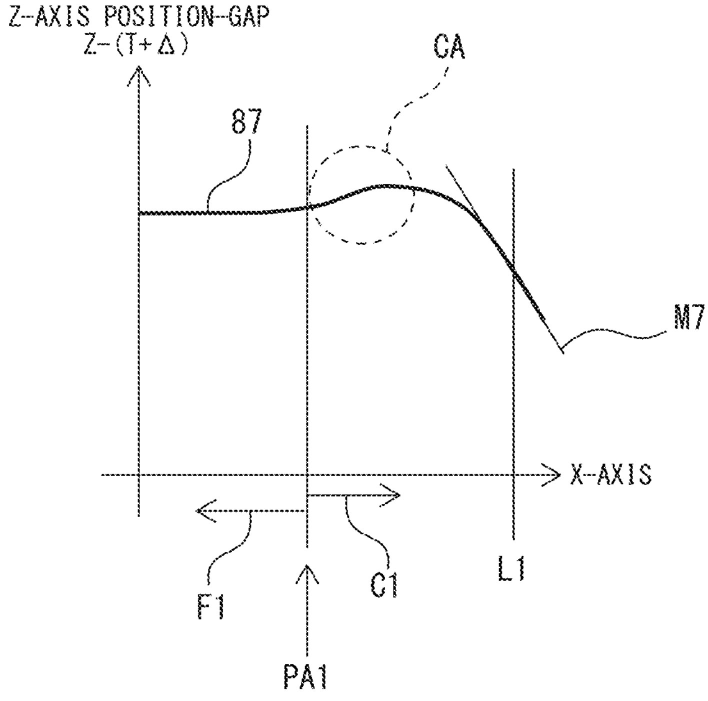
FIG. 18 is a graph for illustrating variations in the workpiece warping detection operation.
Figure 19:
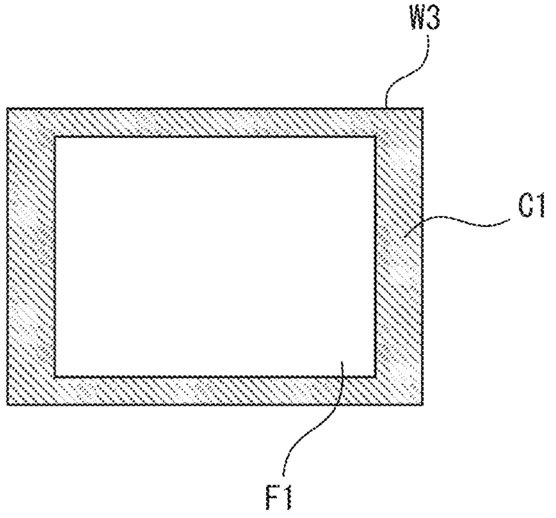
FIG. 19 is a diagram illustrating a state in which a processable area is set excluding a warped part of a workpiece.

Specific operation procedures will be described with reference to FIG. 17 to FIG. 19. "(A rate of gap increase+a Z-axis descending speed)/XY-axes composite speed" (hereinafter described as a measured value for convenience) is used as a variation. Note that FIG. 17 represents a state of operation in this operation example, and FIG. 18 represents changes in the measured value. The operation procedures will be described below.

(c1) Cause the processing head 30 to scan in the scanning direction while performing the gap control (FIG. 17).

(c2) Monitor changes in a graph 87 of measured values (FIG. 18).

(c3) In a stage before a workpiece edge (position L1) is detected, detect an area where the curvature or the magnitude of inclination of the graph 87 exceeds a threshold value as a warped part. In the example in FIG. 18, an area C1 from an area enclosed by a dashed circle CA to the workpiece edge is detected as a warped part.

(c4) Further continue monitoring of the graph 87 of the measured values and detect a position where the magnitude of inclination of the graph 87 exceeds a predetermined threshold value M7 (position L1) as the workpiece edge (FIG. 18).

By the aforementioned procedures, a warped part occurring at the periphery of the workpiece on one side of the workpiece in the scanning direction can be detected. Next, by executing (d1) perform the aforementioned procedures (c1 to c4) on the four sides of the workpiece or executing (d2) perform the aforementioned procedures (c1 to c4) on two sides of the workpiece and assume that a warped part exists similarly on each opposite side, warped area can be identified for the four sides of the workpiece. Warped parts may be detected at a plurality of spots on one side by the aforementioned procedures (c1 to c4) in either one of the aforementioned procedures (d1) and (d2), and the shape of the warped part in a direction along the side may be identified in more detail.

The controller 10 may display positional information of the identified area of the warped part on a user interface screen in the controller 10. In this case, an area C1 of a warped part with respect to a workpiece W3 may be displayed as an image as illustrated in FIG. 19. A user can make a correction of a processing target area in such a way as to avoid the warped part. Alternatively, the controller 10 may be configured to automatically execute a correction of the processing area in such a way as to avoid the warped part. As an example, when the area C1 is detected as a warped part on the workpiece W3 as illustrated in FIG. 19, the controller 10 may set an area F1 excluding the area C1 from the workpiece W3 (an area inside a position PA1 in FIG. 18) as a processable area.

Figure 20:
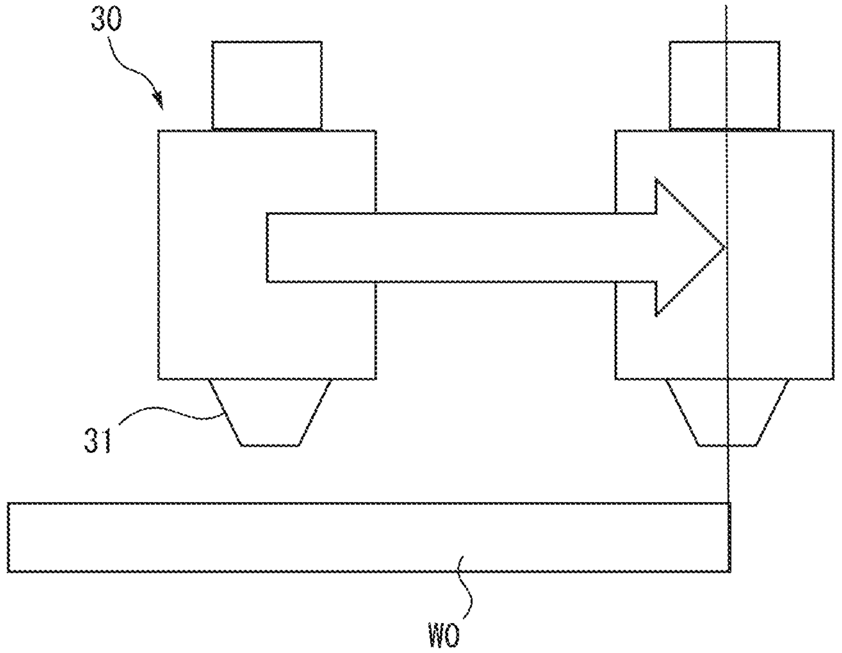
FIG. 20 is a diagram illustrating a scanning state of the processing head in a workpiece edge detection operation in a comparative example.

For understanding of usefulness of the workpiece edge detection operation according to the present embodiment, a detection operation example of a workpiece edge performed by previously storing an output value of a gap sensor when a workpiece exists (detected value 1) and an output value of the gap sensor at the workpiece edge (detected value 2) into the controller will be described with reference to FIG. 20 to FIG. 22 as a comparative example. In the comparative example, the Z-axis height of the processing head 30 (gap sensor 31) with respect to a workpiece W0 is set to a predetermined value, and the processing head 30 is caused to move (scan) while detecting a gap amount, as illustrated in FIG. 20.

In such an operation, when the processing head 30 (gap sensor 31) is placed above the surface of the workpiece W0, the detected value 1 is detected as the output of the gap sensor 31. On the other hand, when the processing head 30 (gap sensor 31) reaches the edge of the workpiece W0, the detected value 2 is detected as the output of the gap sensor 31, and therefore a gap edge can be detected. A graph 181 in FIG. 22 represents changes in the output of the gap sensor 31 in this case. The output of the gap sensor 31 reaches the detected value 2 at a workpiece edge position L10 on the graph 181, and by detection of the above, the workpiece edge position L10 is detected.

Figure 21:
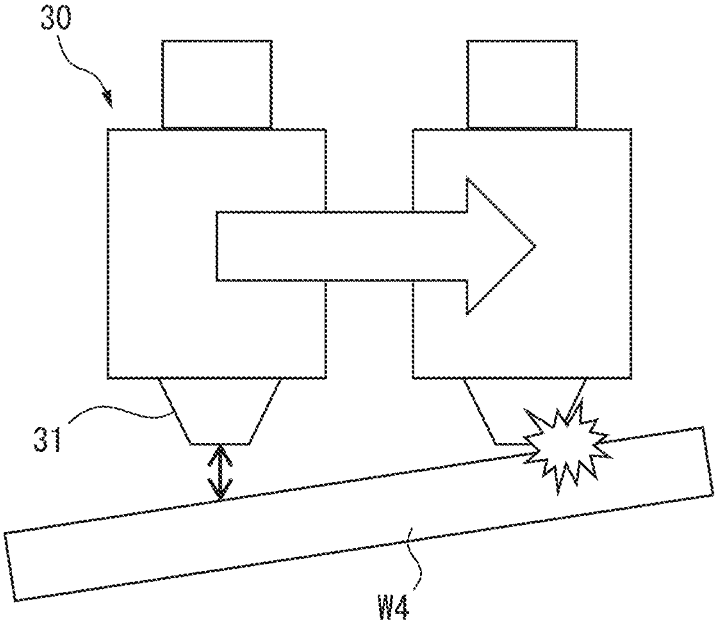
FIG. 21 is a diagram illustrating a state in which the processing head is in contact with a workpiece in the workpiece edge detection operation in the comparative example.

However, a workpiece W4 including an inclined part at the periphery is assumed as illustrated in FIG. 21. In scanning in the comparative example, the Z-axis position of the processing head 30 is fixed, and therefore output values as illustrated in graphs 181 and 182 in FIG. 22 may be detected depending on the degree of inclination. The graph 182 represents an example of changes in the output of the gap sensor 31 when the angle of inclination is relatively small. In the case of the graph 182, as the processing head 30 approaches the edge of the workpiece, the space to the workpiece narrows, and the value of the graph 182 gradually decreases; and when the processing head 30 subsequently exceeds the workpiece edge, the value increases. In the case of the graph 182, when the workpiece edge is detected by using the fixed detected value 2, a position L11 in FIG. 22 is detected, and therefore an incorrect position is detected as the workpiece edge.

Figure 22:
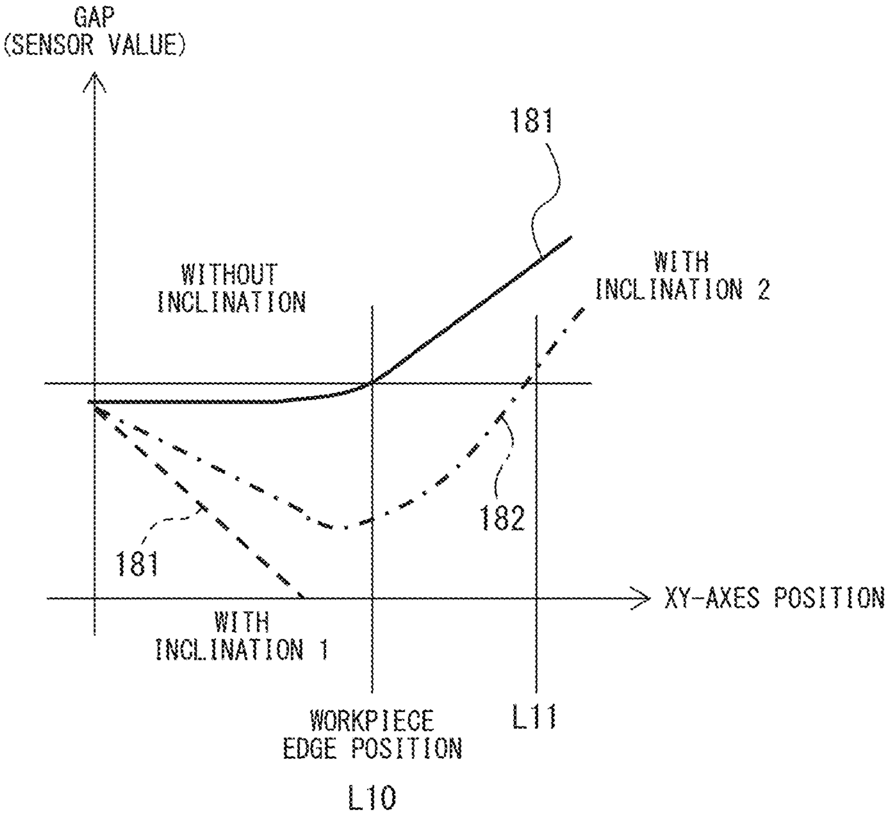
FIG. 22 is a graph illustrating a gap amount in the workpiece edge detection operation in the comparative example.

Furthermore, when the degree of inclination is high, a case of the processing head 30 coming in contact with the workpiece surface in an intermediate stage in which the processing head 30 is moving toward the workpiece edge may occur, as illustrated in the graph 181 in FIG. 22 (see FIG. 21). In this respect, the workpiece edge detection operation according to the present embodiment performs the gap control and therefore can reliably avoid the workpiece edge without being affected by the inclination of the workpiece.

The controller 10 may further include at least one of the following functions.

(1) Offset correction (2) Combined use of a high-speed operation and a low-speed operation (3) Falling prevention Offset Correction As described above, a workpiece edge is detected based on increase in a gap control amount or the like, and therefore an error may occur between an actual workpiece edge position and a detected position, according to the present embodiment. The controller 10 (control unit 11) may have a function of correcting such an error (hereinafter also described as an offset correction). The error may be considered to depend on scanning speed, a threshold value, responsiveness of the gap sensor 31, and the like. As will be described below, the controller 10 can set an error.

It is difficult to completely determine an error by calculation since sensitivity to any position in the gap sensor needs to be previously determined. Therefore, as an example, a calculation technique of estimating changed scanning speed and a changed gap control gain, based on an actual error when detection is performed with a certain threshold value and a certain gap sensor is employed. While a viewpoint of applying calculation rules of (r1) as for scanning speed, an error is simply proportional to scanning speed and (r2) as a gap control gain increases, trackability improves, and therefore an error decreases may be employed as a calculation technique in this case, application of (r1) and (r2) varies depending on a value to be used as a variation. Therefore, a calculation technique for each of aforementioned Example 1 to Example 6 may be employed as follows.

Example 1 to Example 4: An error depends on scanning speed and a gap control gain. Dependence on scanning speed is similar (proportional) across Example 1 to Example 4. On the other hand, dependence on a gap control gain varies among Example 1 to Example 4. When a gap control gain increases, a position untrackable by the gap control is determined to be a workpiece edge and therefore an error increases by an increase in a trackable distance in Example 1 and Example 4; whereas, tracking is performed by the gap control and a workpiece edge is determined by the tracking position or increase in speed, and therefore an error decreases in Example 2 and Example 3.

Example 5: An error depends on scanning speed but does not depend on a gap control gain.

Example 6: An error depends on neither scanning speed nor gap control gain.

Combined Use of High-Speed Operation and Low-Speed Operation

Faster scanning speed provides a merit of shortening a cycle time but has a property of increasing an error in detection of a workpiece edge position. Therefore, operations of (e1) First, detecting an approximate position of the workpiece edge by high-speed scanning and (e2) Next, detecting an accurate position of the workpiece edge by performing low-speed scanning are performed. The technique is a technique providing both of the merit of cycle time shortening and the merit of accurate position detection. Two specific operation examples will be described.

Figure 23:
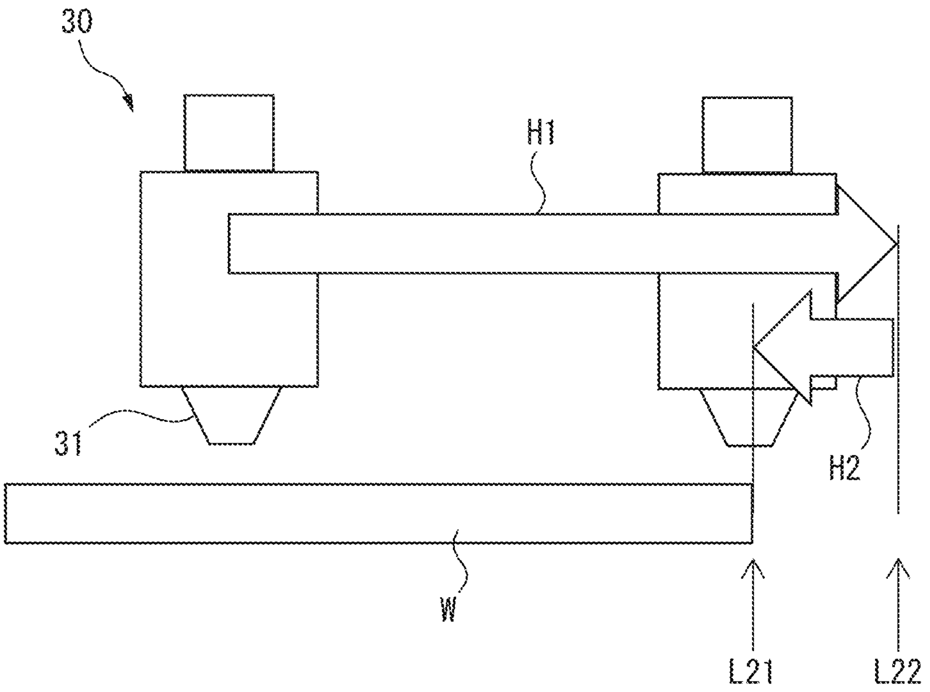
FIG. 23 is a diagram illustrating a first example of a workpiece edge detection operation performed by combined use of high-speed scanning and low-speed scanning.

FIG. 23 is a diagram illustrating a scanning state in a first example of workpiece edge detection by combined use of a high-speed operation and a low-speed operation. The operation is performed in accordance with the following procedures in this example.

(f1) First, an approximate position of a workpiece edge is detected by causing the processing head to perform high-speed scanning in a scanning direction H1. A workpiece edge position L22 is detected. Note that one of aforementioned Example 1 to Example 6 may be employed as a workpiece edge detection operation in this case.

(f2) Next, the processing head 30 is caused to perform scanning at a low speed while performing the gap control in an opposite scanning direction H2. Then, a position L21 where the detected gap amount returns to a target value (T) is detected as the workpiece edge position. Thus, an accurate workpiece edge position can be detected.

Figure 24:
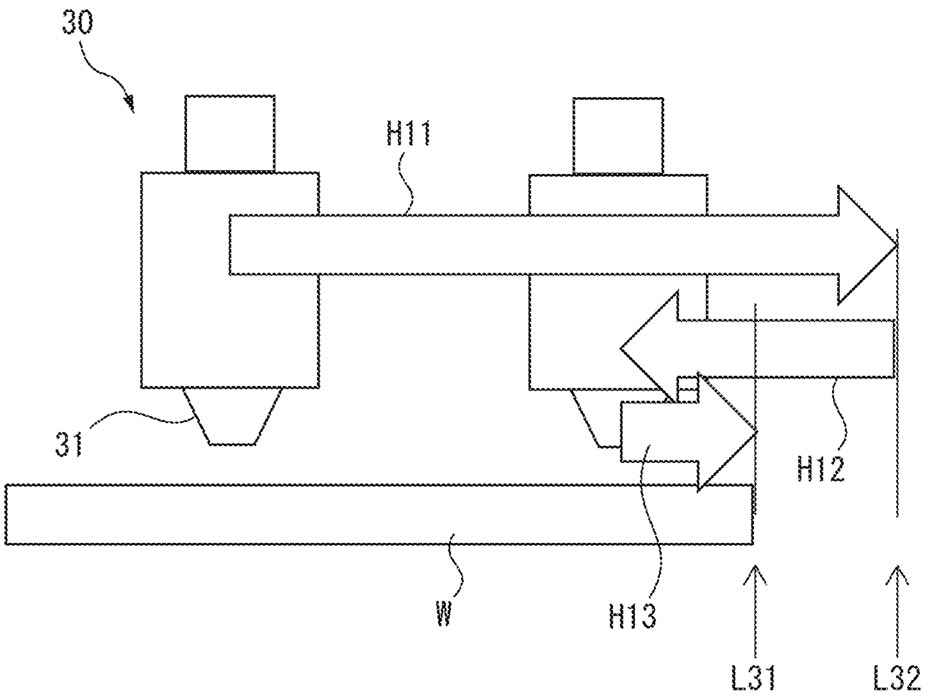
FIG. 24 is a diagram illustrating a second example of the workpiece edge detection operation performed by combined use of high-speed scanning and low-speed scanning.

FIG. 24 is a diagram illustrating a scanning state in a second example of workpiece edge detection by combined use of a high-speed operation and a low-speed operation. The operation is performed in accordance with the following procedures in this example.

(g1) First, an approximate position of a workpiece edge is detected by causing the processing head 30 to perform high-speed scanning in a scanning direction H11. A workpiece edge position L32 is detected. Note that one of aforementioned Example 1 to Example 6 may be employed as a workpiece edge detection operation in this case.

(g2) Next, the processing head 30 is caused to back off in an opposite direction H12 by a predetermined distance and the gap amount returns to the original gap by the gap control.

(g3) Next, the processing head 30 is caused to perform low-speed scanning in a scanning direction H13, and a workpiece edge is detected. A workpiece edge position L31 is detected. Note that one of aforementioned Example 1 to Example 6 may be employed as a workpiece edge detection operation in this case.

Figure 25:
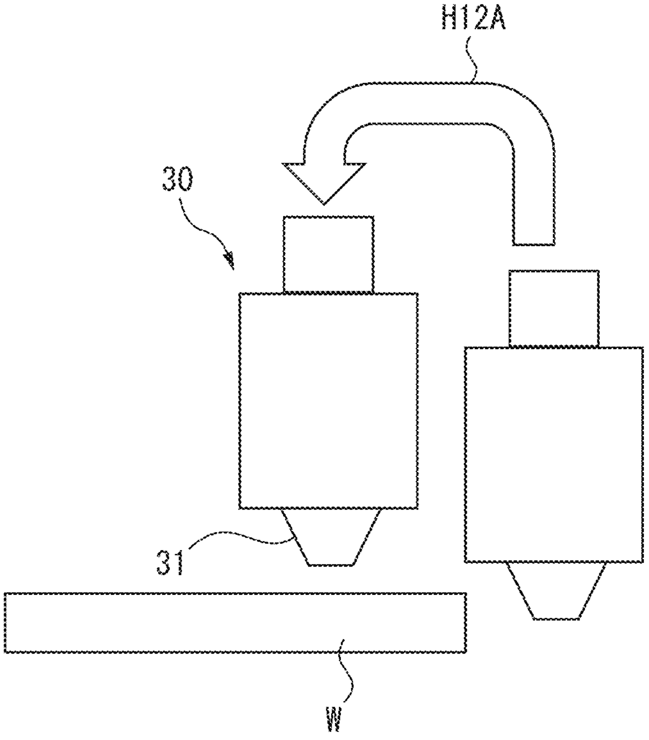
FIG. 25 is a diagram illustrating an operation of returning the processing head in the second example of the workpiece edge detection operation performed by combined use of high-speed scanning and low-speed scanning.

When the processing head 30 is caused to back off in the aforementioned procedure (g2), the processing head 30 may be temporarily caused to retract upward and then be caused to back off in the direction opposite to the scanning direction H11 by the predetermined distance, and the gap amount may be caused to return to the original gap by the gap control, as indicated by an arrow H12A in FIG. 25. Thus, collision of the processing head 30 with the workpiece W can be reliably avoided when the processing head 30 backs off Falling Prevention Function Collision with a work table caused by descent of the gap sensor (processing head) in a hole part on the workpiece during the gap control is prevented. Specific procedures are as follows.

(h1) Scanning is performed in a scanning direction by high-speed scanning while performing the gap control.

(h2) The Z-axis position is monitored during scanning, and descent of the processing head 30 is stopped when the Z-axis position reaches a preset Z-axis lower limit.

As described above, the functions of the workpiece edge position detection according to the present embodiment enable accurate detection of a workpiece edge position even in a situation in which an inclined part exists on an originally flat workpiece.

While the present invention has been described above by using the typical embodiments, it may be understood by a person skilled in the art that changes, and various other changes, omissions, and additions can be made to each of the aforementioned embodiments without departing from the scope of the present invention.

The configuration described in the aforementioned embodiment is applicable to various industrial machines executing various types of processing by a processing head on which a gap sensor is mounted.

The functional configuration of the controller illustrated in FIG. 3 is an example, and not all the functional blocks thereof are essential components. For example, a functional block configuration in which each of the workpiece edge detection unit 13 and the workpiece warping detection unit 14 includes the function of the variation acquisition unit 12 may be provided.

A program executing procedures providing the workpiece edge detection processing described in the aforementioned embodiment and various other functions may be recorded on various computer-readable recording media (such as semiconductor memories such as a ROM, an EEPROM, and a flash memory, a magnetic recording medium, and optical disks such as a CD-ROM and a DVD-ROM).

REFERENCE SIGNS LIST

10 Controller
11 Control unit
12 Variation acquisition unit
13 Workpiece edge detection unit
14 Workpiece warping detection unit
20 Servo amplifier
30 Processing head
31 Gap sensor
40 Gap sensor circuit
50 Axial motor
100 Workpiece edge position detection device

The invention claimed is:

1. A workpiece edge position detection device, comprising:

a control unit configured to control, while causing a processing head on which a gap sensor is mounted to scan along a surface of a workpiece, a position of the processing head in such a way as to keep a space to the workpiece constant, the space being detected by the gap sensor; and a workpiece edge detection unit configured to detect, during execution of control of keeping the space constant by the control unit, a position of an edge of the workpiece, based on a coordinate position of the processing head when a variation in a space between the gap sensor and the workpiece becomes a predetermined threshold value or greater, wherein the variation is an amount acquired from positional information of a motor driving the processing head.

2. The workpiece edge position detection device according to claim 1, wherein the variation is an amount representing a change in a position of the processing head in an axial direction perpendicular to a surface of the workpiece.

3. A workpiece edge position detection device, comprising:

a control unit configured to control, while causing a processing head on which a gap sensor is mounted to scan along a surface of a workpiece, a position of the processing head in such a way as to keep a space to the workpiece constant, the space being detected by the gap sensor; and a workpiece edge detection unit configured to detect, during execution of control of keeping the space constant by the control unit, a position of an edge of the workpiece, based on a coordinate position of the processing head when a variation in a space between the gap sensor and the workpiece becomes a predetermined threshold value or greater, wherein the variation is acquired by time-differentiating a value representing the space between the gap sensor and the workpiece, and the variation is speed of the processing head in an axial direction perpendicular to a surface of the workpiece.

4. A workpiece edge position detection device, comprising:

a control unit configured to control, while causing a processing head on which a gap sensor is mounted to scan along a surface of a workpiece, a position of the processing head in such a way as to keep a space to the workpiece constant, the space being detected by the gap sensor; and a workpiece edge detection unit configured to detect, during execution of control of keeping the space constant by the control unit, a position of an edge of the workpiece, based on a coordinate position of the processing head when a variation in a space between the gap sensor and the workpiece becomes a predetermined threshold value or greater, wherein the variation is a difference between speed of the processing head in an axial direction perpendicular to a surface of the workpiece and a rate of increase of a space to the workpiece when the control unit performs control in such a way as to keep the space constant.

5. A workpiece edge position detection device, comprising:

a control unit configured to control, while causing a processing head on which a gap sensor is mounted to scan along a surface of a workpiece, a position of the processing head in such a way as to keep a space to the workpiece constant, the space being detected by the gap sensor; and a workpiece edge detection unit configured to detect, during execution of control of keeping the space constant by the control unit, a position of an edge of the workpiece, based on a coordinate position of the processing head when a variation in a space between the gap sensor and the workpiece becomes a predetermined threshold value or greater, wherein the variation is acquired by dividing, by speed of the processing head in a scanning direction of the processing head, a difference between speed of the processing head in an axial direction perpendicular to a surface of the workpiece and a rate of increase of a space to the workpiece when the control unit performs control in such a way as to keep the space constant.

6. A workpiece edge position detection device, comprising:

a control unit configured to control, while causing a processing head on which a gap sensor is mounted to scan along a surface of a workpiece, a position of the processing head in such a way as to keep a space to the workpiece constant, the space being detected by the gap sensor;

a workpiece edge detection unit configured to detect, during execution of control of keeping the space constant by the control unit, a position of an edge of the workpiece, based on a coordinate position of the processing head when a variation in a space between the gap sensor and the workpiece becomes a predetermined threshold value or greater; and a workpiece warping detection unit configured to detect an area including warping on the workpiece, based on the variation, wherein the control unit sets an area excluding an area including the warping on the workpiece as a processable area.

7. A workpiece edge position detection method, comprising:

controlling, while causing a processing head on which a gap sensor is mounted to scan along a surface of a workpiece, a position of the processing head in such a way as to keep a space to the workpiece constant, the space being detected by the gap sensor;

acquiring a variation in a space between the gap sensor and the workpiece during execution of control of keeping the space constant; and detecting a position of an edge of the workpiece, based on a coordinate position of the processing head when the acquired variation becomes a predetermined threshold value or greater, wherein the variation is an amount acquired from positional information of a motor driving the processing head.

* * * * *